(12) United States Patent
Wilson

(10) Patent No.: US 10,779,527 B2
(45) Date of Patent: Sep. 22, 2020

(54) ANIMAL CALL

(71) Applicant: Joseph Wilson, Doniphan, MO (US)

(72) Inventor: Joseph Wilson, Doniphan, MO (US)

( * ) Notice: Subject to any disclaimer, the term of this patent is extended or adjusted under 35 U.S.C. 154(b) by 240 days.

(21) Appl. No.: 15/827,372

(22) Filed: Nov. 30, 2017

(65) Prior Publication Data

US 2019/0159445 A1 May 30, 2019

(51) Int. Cl.
*A63H 5/00* (2006.01)
*A01M 31/00* (2006.01)

(52) U.S. Cl.
CPC .................. *A01M 31/004* (2013.01)

(58) Field of Classification Search
CPC .................................................. A01M 31/004
USPC ................................................ 446/207, 416
See application file for complete search history.

(56) References Cited

U.S. PATENT DOCUMENTS

| | | | | |
|---|---|---|---|---|
| 2,493,472 A * | 1/1950 | Yentzen | ............... | A01M 31/004 446/208 |
| 2,518,616 A * | 8/1950 | Herter | ................. | A01M 31/004 446/209 |
| 2,729,025 A * | 1/1956 | Jones | ................. | A01M 31/004 446/208 |
| 4,143,485 A * | 3/1979 | Stewart | .................... | A63H 5/00 446/207 |
| 4,151,678 A * | 5/1979 | Robertson | ................ | G10D 7/12 446/209 |
| 5,910,039 A | 6/1999 | Primos et al. | | |
| 6,039,627 A | 3/2000 | Forbes et al. | | |
| 7,465,213 B1 | 12/2008 | Pribbanow | | |
| 7,658,660 B1 * | 2/2010 | Drury | ................. | A01M 31/004 446/206 |
| 7,918,709 B1 * | 4/2011 | Primos | ................ | A01M 31/004 446/202 |
| D642,950 S * | 8/2011 | Barden | ..................... | D10/119.1 |
| 10,058,090 B2 * | 8/2018 | Billy | ................... | A01M 31/004 |
| 2017/0000108 A1 | 1/2017 | Bean et al. | | |
| 2017/0035045 A1 * | 2/2017 | Rouse | ................. | A01M 31/004 |

(Continued)

OTHER PUBLICATIONS

Flextone Game Calls—Buck Collector; UPC 8 15097 009853 2; www.flextonegamecalls.com online catalog, p. No. 116.

(Continued)

*Primary Examiner* — Joseph B Baldori
(74) *Attorney, Agent, or Firm* — Sandberg Phoenix & von Gontard, P.C

(57) ABSTRACT

A reed-actuated animal call having a double-reed assembly and triple-reed assembly. The double-reed assembly has a short reed positioned atop a long reed positioned atop a sound board. An air passage is formed in the top of the sound board underneath the long reed. The long reed extends a determined length beyond the end of the short reed, the short reed constraining the long reed to enable the rapid activation of the long reed. The triple-reed assembly has an additional mid-length reed positioned between the short and long reeds. The long reed extends a determined length beyond the end of the mid-length reed, the mid-length reed extends a determined length beyond the short reed above the sound board, and the mid-length and short reeds constrain the long reed so as to enable the rapid activation of the long reed with a different resonance than the double-reed assembly.

22 Claims, 7 Drawing Sheets

(56) References Cited

U.S. PATENT DOCUMENTS

2017/0055518 A1    3/2017    Thomas et al.
2017/0055519 A1    3/2017    Thomas et al.

OTHER PUBLICATIONS

Duel Game Calls—Stretchback Deer Call; www.duelgamecalls.com/collectionsideer-calls webpage product information.
Primos Hunting—Trophy Grunter product information from web page www.primos.com/primos-hunting/hunting-calls/deer/trophy-grunter.
Hunters Specialties—True Talker product information from web page www.hunterspec.com/TRUE+TALKER.
Hunters Specialties—Instigator product information from www.wholesalehunter.com/Product/Details.

* cited by examiner

ANIMAL CALL

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to manual air-driven animal calls, and more particularly to a novel reed animal call having multiple channels with unique multi-reed configurations that improves the vocalization of the call. The call has particular application to deer.

In the sport of hunting, and in particular the sport of deer hunting, it is often desirable to attempt to draw the desired quarry to a location near which the hunter is hidden or otherwise lying in wait. This can be accomplished in a variety of ways. For example, the hunter can lay out food or other staples, such as salt or minerals, that are part of the desired quarry's diet. Alternatively, the hunter can place odorous chemicals in the vicinity of the hunter's position that contain pheromones or other such biological agents that attract the desired quarry. Yet another method is for the hunter to produce or generate an auditory call, such as a mating call or a male challenge call, that the desired quarry will recognize and will want to investigate. Such animal calls have a variety of types, including calls that operate by manually blowing air through a channel and over a reed to produce one or more sounds for a specific quarry, such as deer.

With regard to the hunting of deer, there exist a number of commercial configurations of reed calls with various features, functions and capabilities. For example, many of the calls utilize a single reed, while others utilize multiple reeds. Some, by way of further example, have fixed or rigid sound chambers, while others have sound chambers that can be compressed, elongated or twisted for use. However, it has been found that existing reed deer calls share common shortcomings. In particular, existing reed deer calls have reed configurations that require that a substantial force of air at an elevated pressure be directed over the reed before the reed will activate. This results in an undesirable delay in producing sounds from the call and/or the undesirable generation of unnaturally loud or incorrect sounds being generated by such calls at the start of each call when first blown by the user.

It would therefore be desirable to have a multiple reed animal call that is configured in such a way that the reeds activate rapidly and without excessive air pressure when the call is blown by the user. It would further be desirable to have a multiple reed animal call that is configured in such a way that the reeds do not generate unnaturally loud or incorrect sounds when the call is first blown by the user. As will become evident in this disclosure, the present invention provides such benefits over the existing art.

BRIEF DESCRIPTION OF THE DRAWINGS

The illustrative embodiments of the present invention are shown in the following drawings which form a part of the specification.

Corresponding reference characters indicate corresponding parts throughout the several views of the drawings.

DETAILED DESCRIPTION

Figure 1:
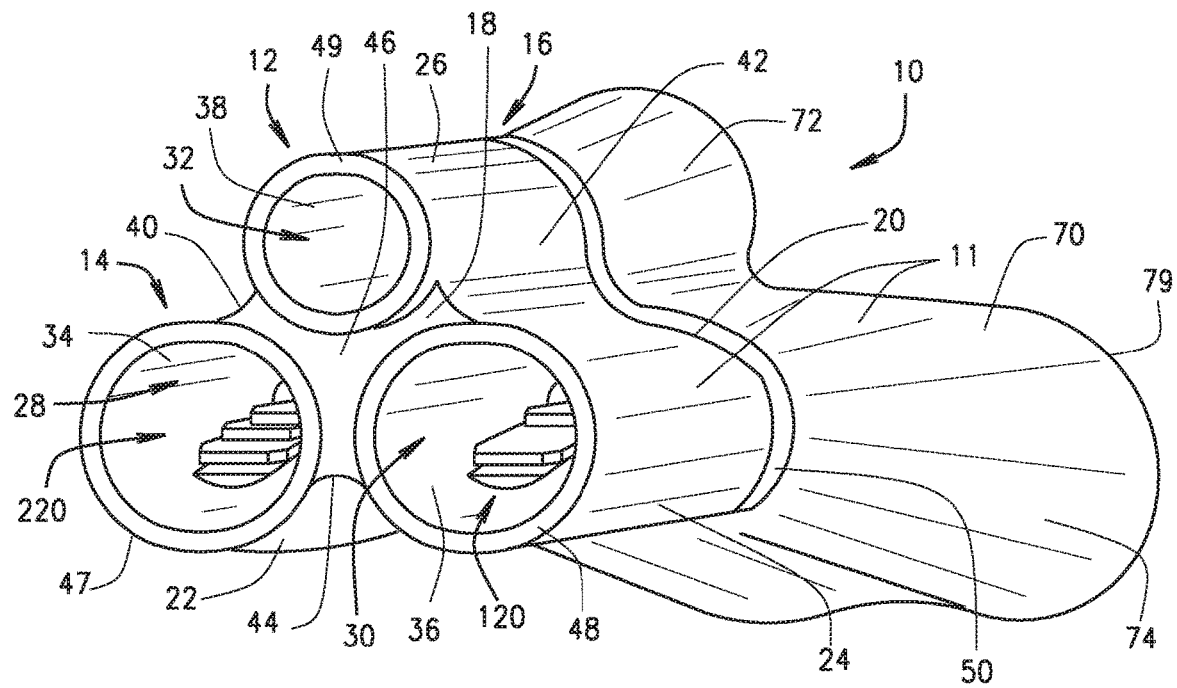
FIG. 1 is a perspective view of a representative embodiment of a multi-reed animal call incorporating various features of the present disclosure.
Figure 2:
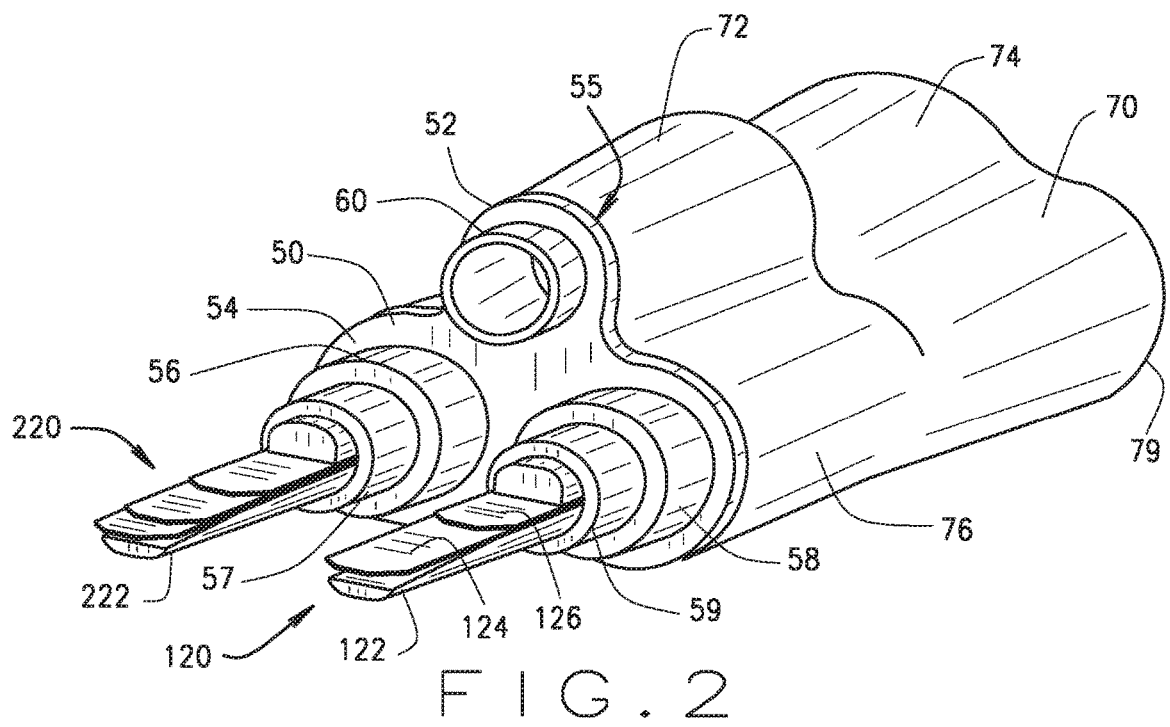
FIG. 2 is a perspective view of the animal call of FIG. 1 with the mouthpiece removed.
Figure 3:
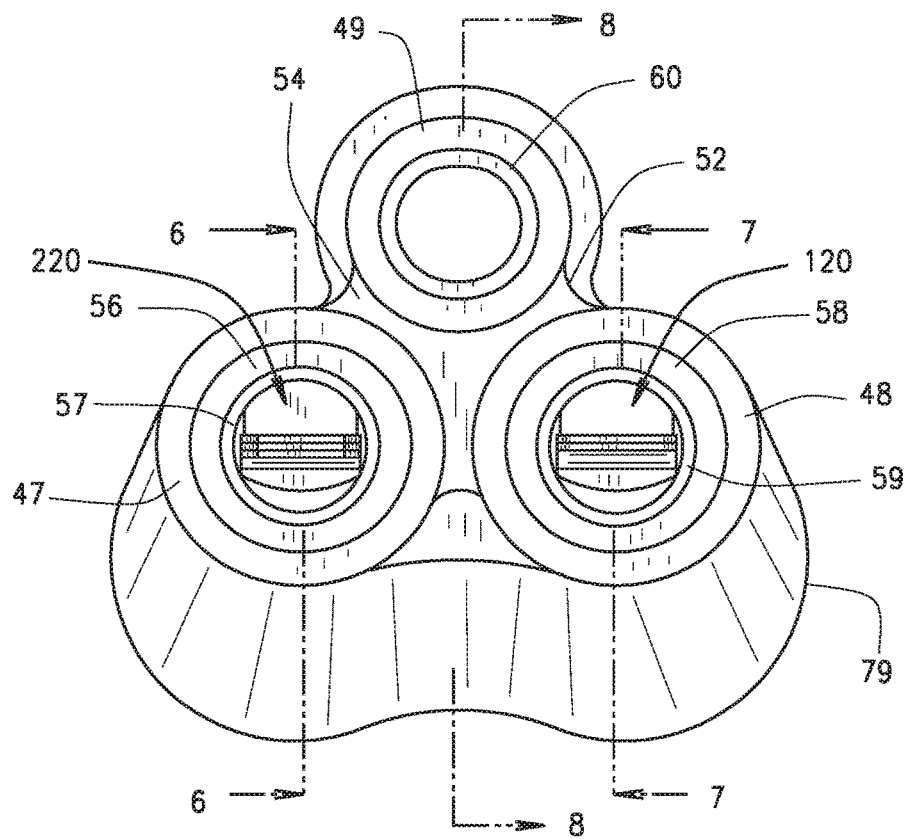
FIG. 3 is a front view of the animal call of FIG. 1.

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

In referring to the drawings, a first representative embodiment of the novel multi-reed animal call 10 of the present invention is shown generally in FIGS. 1-10, where the present invention is depicted by way of example. In this first representative embodiment, the animal call 10 has a body 11 comprising a mouthpiece 12, a connecting collar 50, and a resonator 70. A double-reed assembly 120 and a triple reed assembly 220 are both housed within the body 11. With the exception of adhesives and reeds positioned in the reed assemblies 120 and 220, all of the components of the animal call 10 are comprised of rigid materials, such as for example wood, injection molded plastic or a machined metal.

The mouthpiece 12 comprises a unitary member having a proximal end 14, a distal end 16, a central strut 18 and a flat mating face 20 on the distal end 16. The mouthpiece 12 further includes three open-ended, generally parallel, conjoined tubes 22, 24 and 26, that extend between the proximal end 14 and the distal end 16, are jointed together by the central strut 18, and terminate at the mating face 20. The mating face 20 lies in a plane that is perpendicular to the tubes 22, 24 and 26. The tubes 22 and 24 are positioned adjacent one another with the tube 26 positioned atop and between tubes 22 and 24, with the central strut 18 positioned between all three. The tubes 22 and 24 are positioned adjacent one another so as to mirror each other lengthwise relative to a vertical plane between the two, with the vertical plane splitting the tube 26 lengthwise between the tubes 22 and 24. The tubes 22, 24 and 26, define parallel tubular chambers, that is, a first upstream chamber 28, a second upstream chamber 30 and a third upstream chamber 32, within and along the lengths of the tubes 22, 24 and 26, respectively, said upstream chambers 28, 30 and 32 having corresponding sidewalls 34, 36 and 38 for each of the tubes 22, 24 and 26, respectively, which all run perpendicular to the mating face 20.

Concave surfaces 40, 42 and 44 join together the sidewalls 34, 36 and 38 along the lengths of the tubes 22, 24 and 26 to define, in part, the central strut 18. That is, the central strut 18 extends from the mating face 20 at the distal end 16 of the mouthpiece 12, along the concave surfaces 40, 42 and 44, to terminate at a flat front face 46 perpendicular to the mating face 20. The central strut 18 is slightly shorter in length than the tubes 22, 24 and 26, such that a portion of each of the tubes 22, 24 and 26, extends away from the central strut 18 to form relative short tube portions or inlets or blowholes 47, 48 and 49, with lengths of approximately 0.25 inches each, such as may be positioned in the mouth of a user for blowing of the call 10. Opposite the blowholes 47, 48 and 49 are openings or outlets 47', 48' (not shown) and 49' (not shown) of the tubes 22, 24 and 26, respectively. (See, e.g., the outlet 47' shown in FIGS. 6, 7).

The chambers 28 and 30 both have the same uniform internal tubular cross-section along their interior lengths, with an inner radius of approximately 0.375 inches and a length of approximately 3.35 inches. The chambers 28 and 30 are each slightly compressed along their lengths so as to form a uniform flat of approximately 0.25 inches in width at the top and bottom of the interior surface of each. The chamber 32 is somewhat smaller in diameter than the chambers 28 and 30, with an inner radius of approximately 0.25 inches, but slightly longer with a length of approximately 3.50 inches. Other than where they intersect with the central strut 18, the sidewalls 34, 36 and 38 have a uniform width of approximately 0.063 inches. Alternatively, the chambers 28 and 30 can be cylindrical without a flat or compressed shape.

Figure 4:
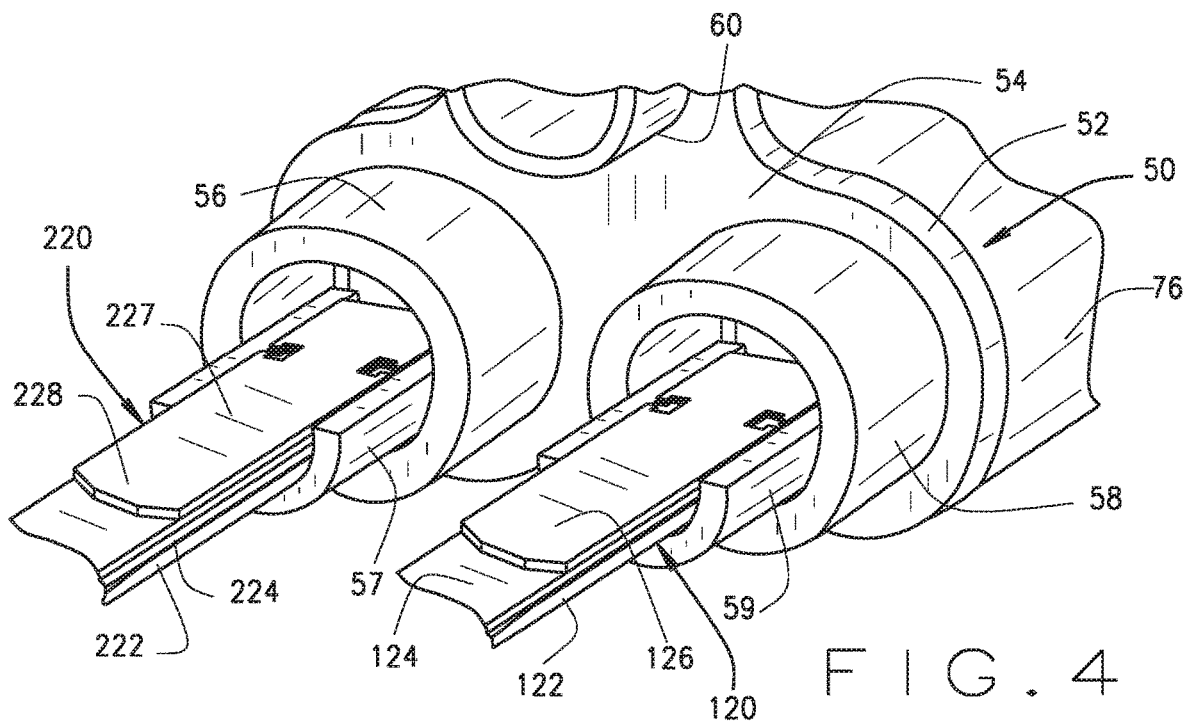
FIG. 4 is a partial perspective view of the animal call of FIG. 1 with a partial cutaway of the double reed holder.
Figure 5:
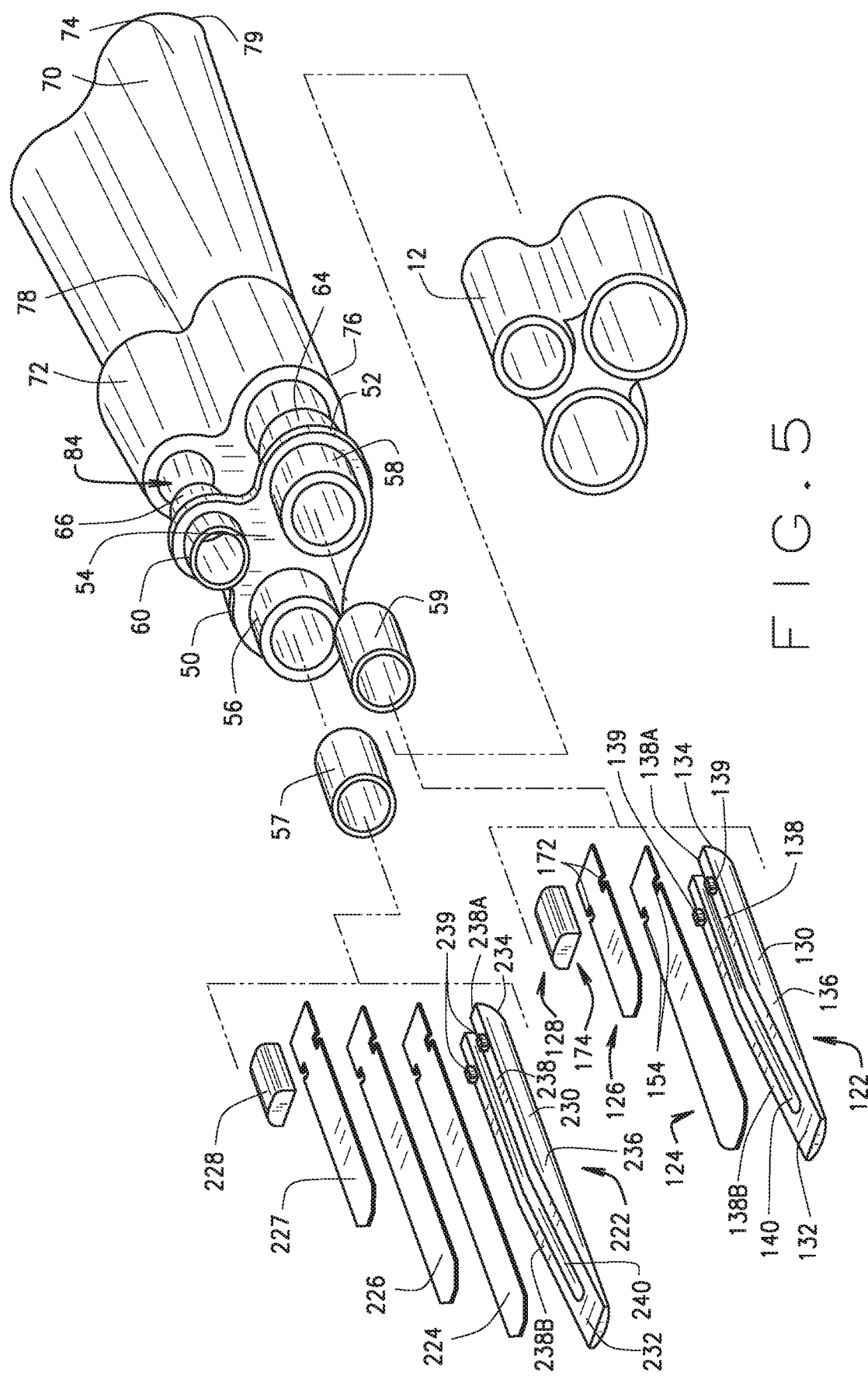
FIG. 5 is an exploded view of the animal call of FIG. 1.

The connecting collar 50 is positioned between the mouthpiece 12 and the resonator 70. Turning now to FIG. 4, it can be seen that the connecting collar 50 has a flat central body or plate 52 that is approximately 0.125 inches thick, a flat proximal face 54 on one side of the plate 52 that faces and mirrors the flat mating face 20 of the mouthpiece 12, and a flat distal face 55 on the plate 52 opposite the proximal face 54.

Three cylindrical, tubular and open-ended nipples 56, 58 and 60 protrude vertically from the surface of the proximal face 54 a distance of between 0.375 and 0.500 inches. All of the inner and outer surfaces of the nipples 56, 58 and 60 are parallel to one another and perpendicular to the proximal face 54 of the connecting collar 50. The nipples 56 and 58 have generally uniform sidewalls of approximately 0.125 inches in width, while the nipple 60 has a sidewall with a uniform thickness of approximately 0.064 inches. The nipples 56, 58 and 60 are shaped and sized to fit snugly within the tubes 22, 24 and 26, respectively, at the distal end 16 of the mouthpiece 12, to thereby securely attach the mouthpiece 12 to the connecting collar 50. Of course, appropriate adhesives or solders or other means of attachment may be used to secure the two components together.

Figure 11:
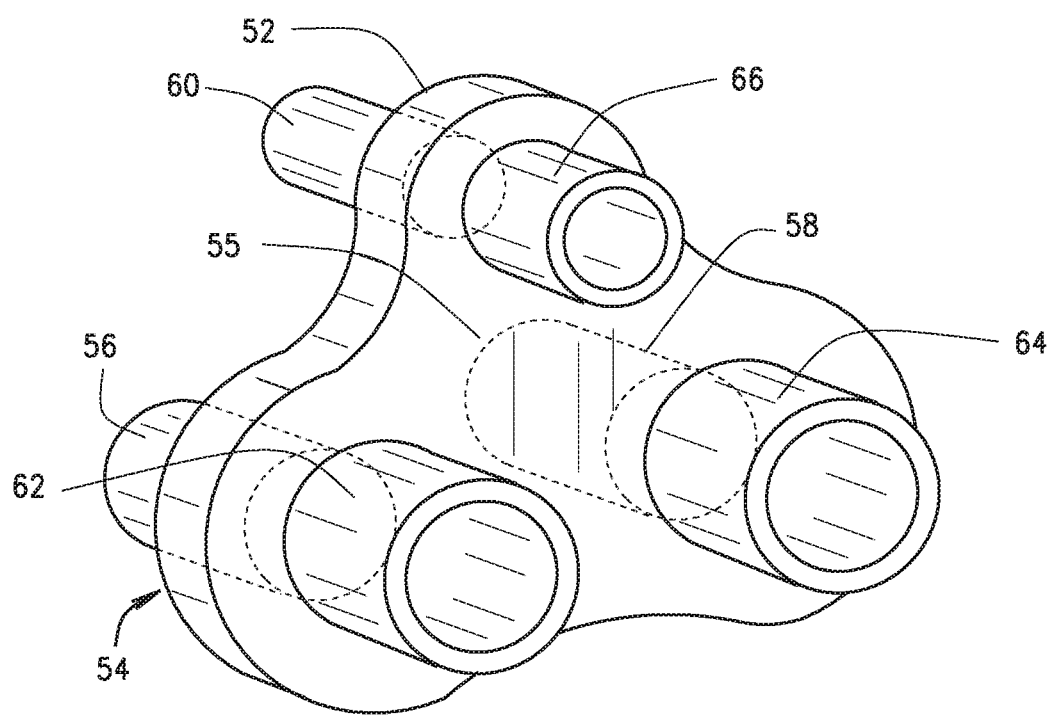
FIG. 11 is a perspective view of the connecting collar of the animal call of FIG. 1, with certain features of said connecting collar depicted by way of ghost images.

In addition, as can be seen in FIG. 11, three cylindrical, tubular and open-ended nipples 62, 64 and 66 protrude vertically from the surface of the distal face 55 a distance of between 0.375 and 0.500 inches, opposite the nipples 56, 58 and 60. All of the inner and outer surfaces of the nipples 62, 64 and 66 are parallel to one another and perpendicular to the distal face 55 of the connecting collar 50. The nipples 62 and 64 have sidewalls of approximately 0.172 inches in width, while the nipple 60 has a sidewall with a uniform thickness of approximately 0.064 inches. It will be understood that all of the nipples 56, 58 and 60, and 62, 64 and 66, are hollow and open-ended, with smooth bores extending through the nipple 56 and into the nipple 62, through the nipple 58 fits into the nipple 64, and through the nipple 60 and into the nipple 66, such that the interfaces of the nipples protruding from the proximal face 54 with the nipples protruding from the distal face 55 have no lips or ledges formed there between.

A pair of 1.000 inch long, cylindrical tubes or reed assembly holders 57 and 59 are positioned in the nipples 56 and 58, respectively. Both of the reed assembly holders 57 and 59 have an inner diameter of approximately 0.563 inches, an outer diameter of approximately 0.375 inches and a uniform wall thickness of 0.094 inches.

Figure 6:
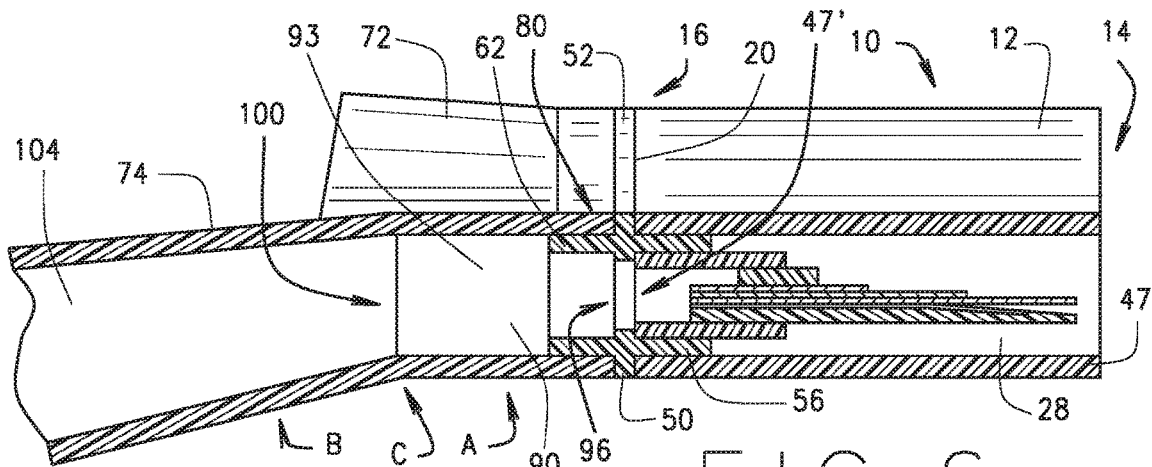
FIG. 6 is a side sectional view through the double reed portion of the animal call of FIG. 1.
Figure 7:
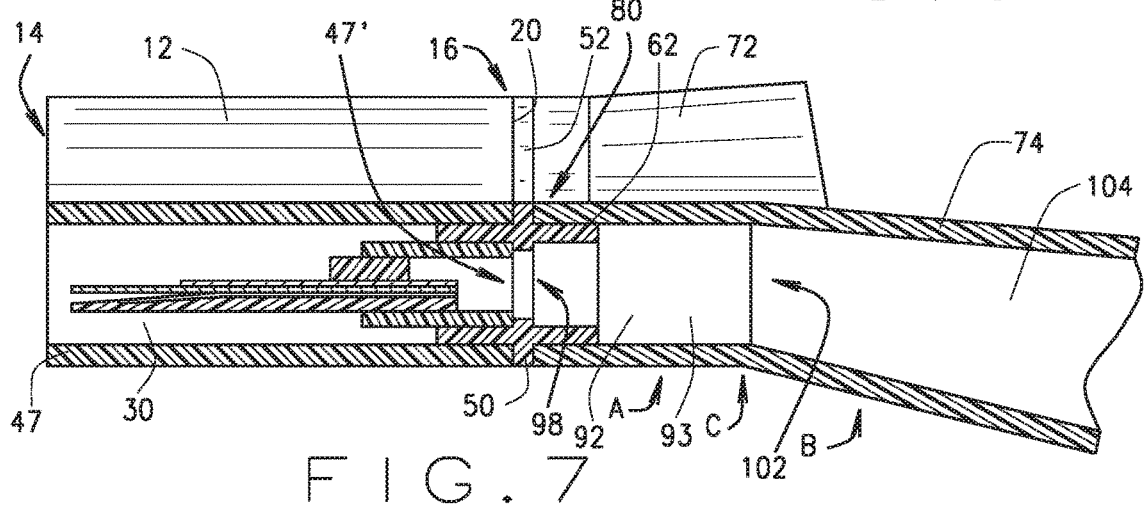
FIG. 7 is a side sectional view through the triple reed portion of the animal call of FIG. 1.
Figure 8:
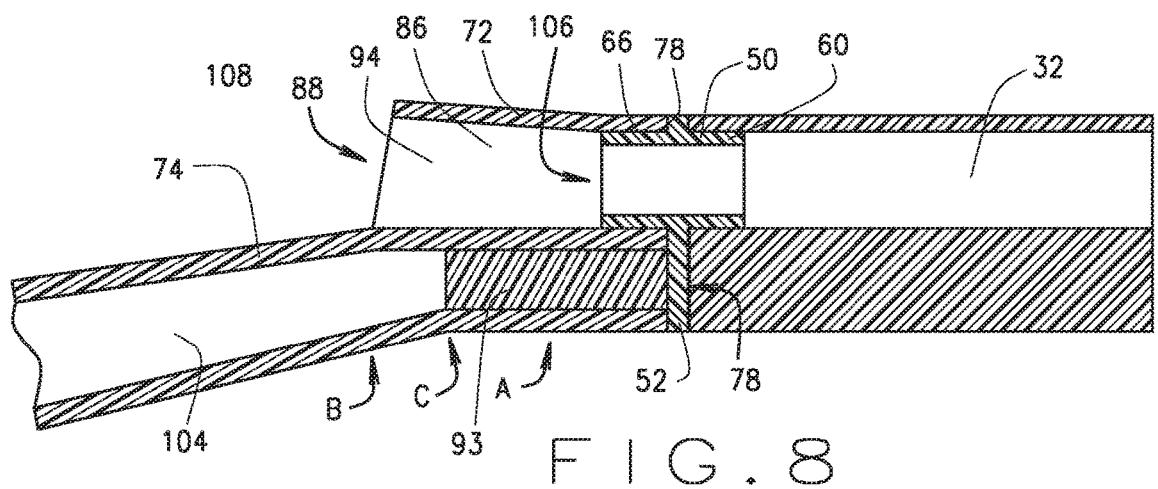
FIG. 8 is a side sectional view of the animal call of FIG. 1.
Figure 9:
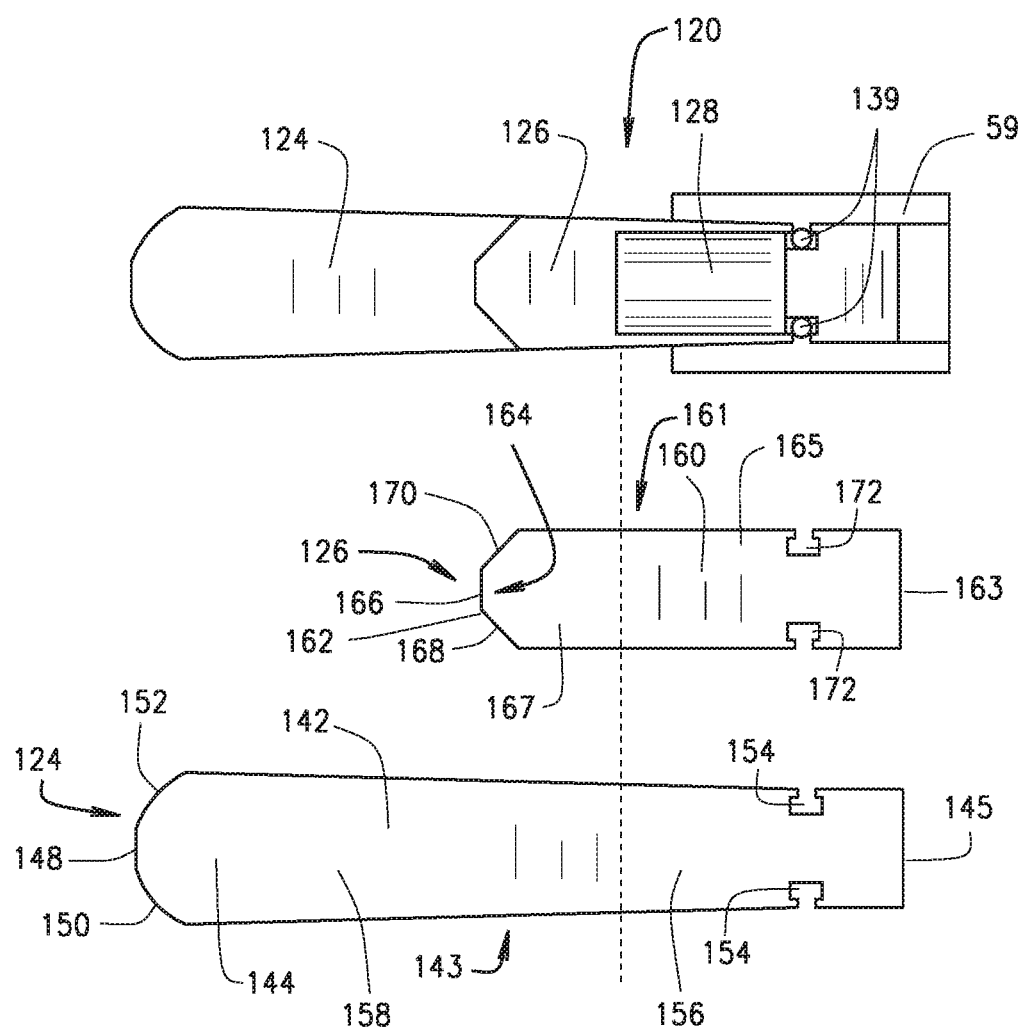
FIG. 9 is a top view of the reed assembly and each of the reeds for the triple reed portion of the animal call of FIG. 1.
Figure 10:
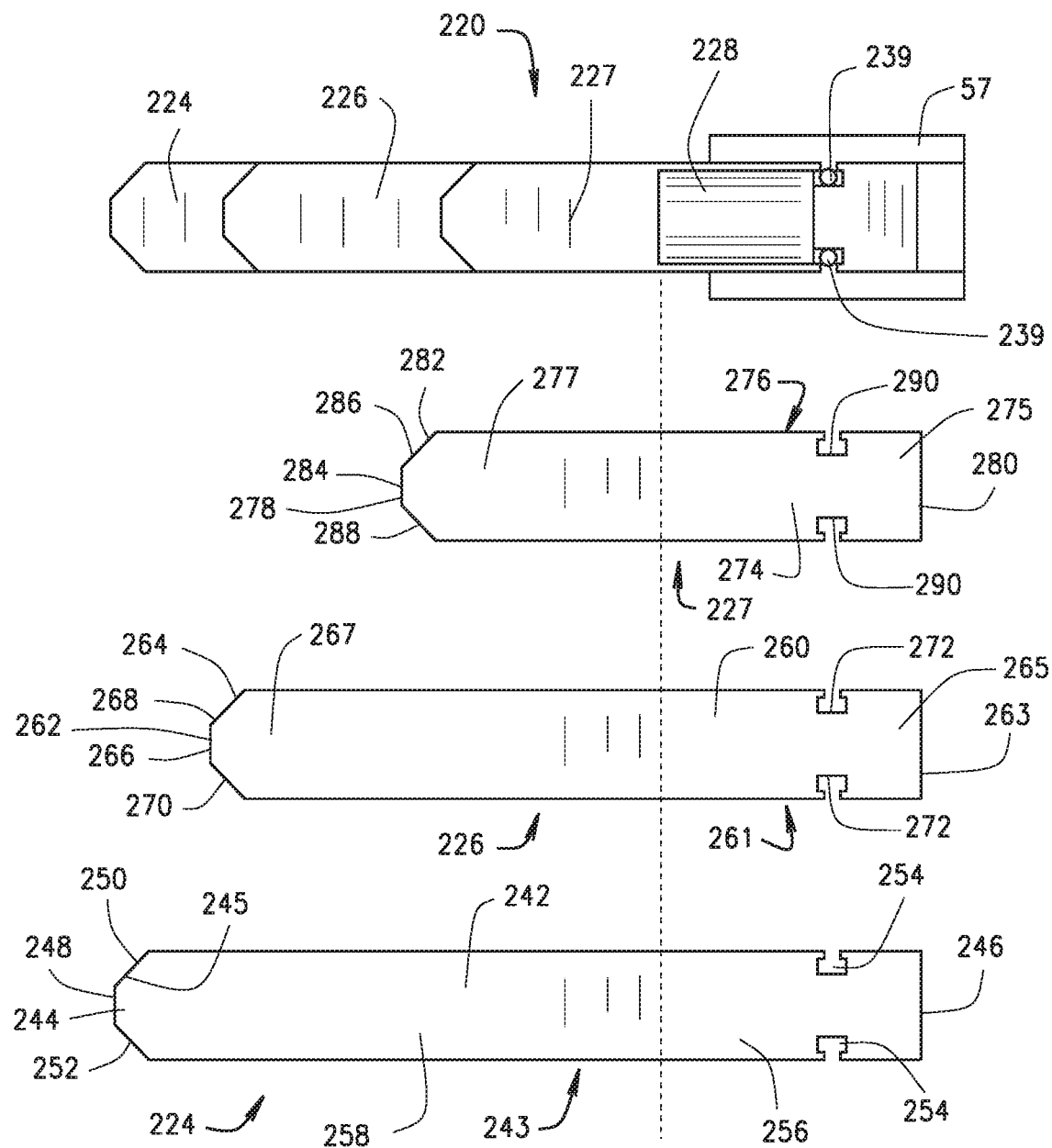
FIG. 10 is a top view of the reed assembly and each of the reeds for the double reed portion of the animal call of FIG. 1.

Referring now to FIGS. 6-8, it will be seen that the resonator 70 consists of an elongated open-ended and hollow upper body 72 and a larger elongated open-ended and hollow lower body 74. The upper body 72 and lower body 74 share a common proximal end 76 with a flat mating face 78 that mirrors the distal face 55 of the connecting collar 50, while the lower body 74 terminates at a distal end 79. The mating face 78 is shaped and sized to mirror the distal face 55 of the connecting collar 50 with orifices 80, 82 and 84 (see FIGS. 5, 6-7, 11), oriented and sized and shaped to snugly receive the nipples 62, 64 and 66, respectively. Correspondingly, it will be appreciated that the three nipples 62, 64 and 66 are oriented and shaped and sized to fit snugly within their corresponding orifices 80, 82 and 84, respectively, in the resonator 70, to thereby attach the resonator 70 to the connecting collar 50. Of course, appropriate adhesives or solders or other attachment means may be used to secure the two components together.

The orifice 80 opens into an open-ended first sound chamber 86 (FIG. 8) formed within the upper body 72. The first sound chamber 86 has a length of approximately 1.82 inches and with gradual upward and outward tapers of approximately 3 degrees as it extends through the upper body 72 away from the mating face 78 to terminate at an opening 88. The opening 88 being generally circular with a width of approximately 0897 inches and a height of approximately 0.692 inches, and having a sidewall thickness of approximately 0.125 inches. The top of the upper body 72 is slightly shorter than the bottom of the upper body 72 such that the opening 88 slopes approximately 15 degrees to join the two.

The lower body 74 has an exterior shape that resembles a stretched cowbell with a straight portion A, a flared portion B, and an interface C there between. A single bend of approximately 10 degrees at interface A, located approximately two inches from the proximal end 76 of the resonator 70, generally corresponds to the bottom of the opening 88 of the first sound chamber 86 in the upper body 72. The flared portion B of the lower body 74 tilts slightly downward away from the upper body 72 at an angle of approximately 3 degrees, and from the interface C expands in width and height in a uniform manner at a slope of approximately 3 degrees until terminating at the distal end 79 of the resonator 70.

The lower body 74 houses a first downstream chamber 90 and a second interior downstream chamber 92, separated by an interior wall 93, while the upper body 72 houses a third downstream chamber 94 (See FIGS. 6-8). The downstream chambers 90 and 92 have fully open proximal ends 96 and 98, respectively, that are formed in the mating face 78 of the resonator 70 and define the orifices 80 and 82, respectively.

The downstream chambers 90 and 92 further have fully open distal ends 100 and 102, respectively, opposite the proximal ends 96 and 98, that open past the interior wall 93 into a common downstream chamber 104 formed in the distal end of the lower body 74. The chamber 94 (FIG. 8) has an open proximal end 106 and an open distal end 108 opposite the proximal end 104.

The chambers 90 and 92 are housed within the straight portion A of the lower body 74, while the chamber 104 is housed within the flared portion B of the lower body 74. Both of the chambers 90 and 92 are the same size and shape, both are positioned parallel to one another just below the upper body 72, and both comprise open-ended tubes of uniform cross section along their entire lengths of approximately 1.82 inches. Further, the chambers 90 and 92 are coaxial with and form linear extensions of the chambers 28 and 30, respectively, of the mouthpiece 12.

In contrast, the chamber 94 is housed within the tapered portion B of the lower body 74 and has a compressed frustoconical shape that parallels the outer surface of the tapered portion B with a sidewall of approximately 0.125 inches between.

Referring to FIGS. 2-5, it can be seen that the nipples 56 and 58, protruding from the connecting collar 50, are adapted to receive and seat the reed assemblies 120 and 220, respectively.

The double-reed assembly 120 includes a sound board 122, a first reed 124, a second reed 126 and an upper brace 128. The sound board 122 has an elongated body 130 with a proximal end 132 and a distal end 134 opposite the proximal end 132. The body 130 has a linear lower portion 136 with a semicircular cross-section having a uniform radius of approximately one half inch along its entire length, and a generally flat first upper face 138 extending from the distal end 134 opposite the lower portion 136. The sound board 122 has a length of approximately 3 inches, a width at its distal end 134 of approximately 0.422 inches and a thickness or height at its apex of approximately 0.225 inches. For a length of approximately 1.500 inches from its distal end 134, a horizontal portion 138A of the upper face 138 runs parallel to the bottom of the lower portion 136, and thereafter an angled portion 138B tapers downward at a uniform slope of approximately 10 degrees to terminate at the proximal end 132. An open-ended linear groove 140 is cut into the upper face 138 of the sound board 122. The groove 140 is longitudinally centered in the upper face 138, and has a uniform semicircular cross-section with a uniform depth and width of approximately 0.200 inches at the distal end 134. The groove 140 extends from the distal end 134 and extends along the centerline of the upper face 138 to a point approximately 0.250 inches from the proximal end 132 of the sound board 122, where the tapering upper face 138 intersects the bottom of the groove 140. A pair of small protrusions or pegs 139 project vertically upward from the horizontal portion 138A of the upper face 138 proximate the distal end 134 of the sound board 122. The pegs 139 extend approximately 0.030 inches above the horizontal portion 138A of the sound board 122, which is 0.010 inches greater than the combined thicknesses of the first reed 124 and the second reed 126.

The first reed 124 has a flat top surface 142 and flat bottom surface 143 opposite and parallel to the top surface 142, with a uniform thickness of approximately 0.010 inches. The first reed has a straight fixed end 145 that runs perpendicular to the longitudinal centerline of the reed. Opposite the fixed end 145, the first reed 124 has a U-shaped tip or free end 144 defined by a small central flat 148 that likewise runs perpendicular to the longitudinal centerline of the reed, that is sandwiched between two matching curved edges, 150 and 152, that each link the central flat 148 to the sides of the reed. The first reed 124 has a fixed portion or segment 156 that extends longitudinally from the edge of the fixed end 145 to the distal end of the brace 128 in the reed assembly 120, and a free portion or segment 158 that extends from the tip or flat 148 of the free end 144 to the fixed segment 156 (see FIG. 9), The first reed 124 has an overall length of approximately 2.969 inches, and a width that expands uniformly on both sides of the reed 124 from approximately 0.422 inches at the fixed end 145 to 0.469 inches at its greatest width approximately 0.400 inches from the free end 144. The free end 144 terminates at a flat 148 positioned in the middle of the proximal edge 145. The flat 148 is perpendicular to the centerline of the first reed 124 and parallel to the fixed end 145, with a length of approximately 0.156 inches. The mirrored curved edges 150 and 152 flare outward approximately 0.156 inches on each side of the flat 148 of the first reed 124 to a distance of approximately 0.300 inches toward the fixed end 145, where the first reed 124 reaches its greatest width. Of course, the width of the first reed 124 need not be tapered (see, e.g., FIGS. 1-4).

A pair of matching small, rectangular notches 154 are cut into the opposing sides of the first reed 124 approximately 0.400 inches from the fixed end 145 and approximately 0.010 inches from the nearest side of the reed. Each of the notches 154 opens through a small neck to the nearest side of the first reed 124.

The second reed 126 has a flat top surface 160 and flat bottom surface 161 opposite and parallel to the top surface 160, with a uniform thickness of approximately 0.010 inches. The second reed 126 further has a tip or free end 162 and a fixed end 163 opposite the free end 162, with an overall length of approximately 1.625 inches, and a uniform width along its full length of approximately 0.422 inches. The second reed 126 has a fixed portion or segment 165 that extends from the edge of the fixed end 163 to the distal end of the brace 128 in the reed assembly 120, and a free portion or segment 167 that extends from the tip or flat 166 of the free end 162 to the fixed segment 165 (see FIG. 9), The free end 162 terminates at a generally U-shaped proximal edge 164. A central flat 166 with a length of approximately 0.156 inches is centered in the middle of the proximal edge 164. A pair of mirrored straight portions 168 and 170 extend outward from the proximal edge 164 at an angle of approximately 45 degrees for a distance of approximately 0.133 inches to intersect sides of the second reed 126.

A pair of matching small, rectangular notches 172 are cut into the opposing sides of the second reed 126 approximately 0.400 inches from the fixed end 163 and approximately 0.010 inches from the nearest side of the reed. Each of the notches 172 opens through a small neck to the nearest side of the second reed 126.

The upper brace 128 has a flat, rectangular lower face 174, with a length of approximately 0.625 inches, a width of approximately 0.422 inches, and a uniform semi-circular cross-section with a radius of approximately 0.200 inches along the full length of the brace. Each end of the upper brace 128 is flat and perpendicular to the lower face 174.

When the double-reed assembly 120 is properly assembled, the first reed 124 and the second reed 126 are sandwiched between the sound board 122 and the upper brace 128 in the assembly holder 59, such that: (i) the horizontal portion 138A of the upper face 138 of the sound board 122 engages the bottom surface 143 of the first reed 124 with the distal end 134 of the sound board 122 adjacent the fixed end 145 of the first reed 124, resulting in a wedge-shaped separation or gap G1 between the bottom surface 143 and the angled portion 138B of the upper face 138 of the sound board 122; (ii) the top surface 142 of the first reed 124 engages the bottom surface 161 of the second reed 126 with the fixed end 145 of the first reed 124 adjacent the fixed end 163 of the second reed 126; (iii) the top surface 160 of the second reed 126 engages the lower face 174 of the upper brace 128; and (iv) the first reed 124, the second reed 126, the sound board 122 and the upper brace 128 are positioned snugly into the assembly holder 59 so that the free ends 144 and 162 of the first reed 124 and the second reed 126, respectively, are secured between the sound board 122 and the upper brace 128 in the assembly holder 59.

Further, when the double reed assembly 120 is properly assembled, the pegs 139 align with and are sized and shaped to fit snugly within the notches 154 of the first reed 124, and the notches 172 of the second reed 126. It will be appreciated that the pegs 139 act as alignment pins to hold the reeds 124 and 126 in proper orientation laterally, longitudinally and radially relative to one another, the sound board 122 and the upper brace 128.

The double reed assembly 120 is secured by press fit in the nipple 58 of the connecting collar 50, with the free end 144 of the first reed 122 and the free end 162 of the second reed 126 and the proximal end 132 of the sound board 122, all being directed perpendicularly away from the proximal face 54 of the connecting collar 50, as shown. When the mouthpiece 12 is properly secured to the connecting collar 50 and the connecting collar 50 is properly secured to the resonator 70, as shown, the free end 144 of the first reed 122 and the free end 162 of the second reed 126 and the proximal end 132 of the sound board 122, are all oriented within the tubular chamber 30 of the mouthpiece 12 in proximity to and facing the blowhole 48.

As can be appreciated, when a user blows through the blowhole 48, air will be forced against the front of the reed assembly 120. The second reed 126 acts as a brake or stabilizer for the portion of the first reed 124 extending over the gap G1. Due to the stabilizing presence of the second reed 126 pressed against the top of the first reed 124, the first reed 124 will activate, that is initiate resonant vibration, much quicker than will a traditional multi-reed animal call lacking the disclosed configuration of the reeds. Moreover, it has been determined that for best results, the reeds must be constrained to specific dimensional ranges and/or ratios. In particular, the first reed 124 preferably has the following dimensions: overall length=2.969+0.250/−0.200 inches; length of side to widest point=1.918+0.250/−0.200 inches; width of fixed end 145=0.422+0.188/−0.125 inches; width of the flat 148=0.156+0.188/−0.125 inches; greatest width=0.469+0.18/−0.125 inches; and thickness of 0.010+0.010/−0.003 inches. The second reed 126 preferably has the following dimensions: overall length=1.625+0.250/−0.200 inches; width=0.422+0.188/−0.125 inches; width of the flat 166=0.156+0.188/−0.125 inches; longitudinal length of each straight portion 168=0.133+0.250/−0.200 inches; and thickness of 0.010+0.010/−0.003 inches. One of ordinary skill in the art will recognize that these dimensions, when taken in relation to one another, provide the range of ratios between the various dimensions of each of components of the double reed assembly 120.

Further, the first reed 124 even more preferably has the following dimensions: overall length=2.969+0.100/−0.100 inches; length of side to widest point=1.918+0.100/−0.100 inches; width of fixed end 145=0.422+0.100/−0.100 inches; width of the flat 148=0.156+0.100/−0.100 inches; greatest width=0.469+0.100/−0.100 inches; and thickness of 0.010+0.010/−0.003 inches. The second reed 126 even more preferably has the following dimensions: overall length=1.625+0.100/−0.100 inches; width=0.422+0.100/−0.100 inches; width of the flat 166=0.156+0.100/−0.100 inches; longitudinal length of each straight portion 168=0.133+0.100/−0.100 inches; and thickness of 0.010+0.010/−0.003 inches. Again, one of ordinary skill in the art will recognize that these dimensions, when taken in relation to one another, provide the range of ratios between the various dimensions of each of components of the double reed assembly 120.

The triple reed assembly 220 (see FIGS. 5, 10) includes a sound board 222, a first reed 224, a second reed 226, a third reed 227 and an upper brace 228. The sound board 222 has an elongated body 230 with a proximal end 232 and a distal end 234 opposite the proximal end 232. The body 230 has a linear lower portion 236 with a semicircular cross-section having a uniform radius of approximately one half inch along its entire length, and a generally flat first upper face 238 extending from the distal end 234 opposite the lower portion 236. The sound board 222 has a length of approximately 3 inches, a width at its distal end 234 of approximately 0.422 inches and a thickness or height at its apex of approximately 0.225 inches. For a length of approximately 1.500 inches from its distal end 234, a horizontal portion 238A of the upper face 238 runs parallel to the bottom of the lower portion 236, and thereafter an angled portion 238B tapers downward at a uniform slope of approximately 10 degrees to terminate at the proximal end 232. An open-ended linear groove 240 is cut into the upper face 238 of the sound board 222. The groove 240 is longitudinally centered in the upper face 238, and has a uniform semicircular cross-section with a uniform depth and width of approximately 0.200 inches at the distal end 234. The groove 240 extends from the distal end 234 and extends along the centerline of the upper face 238 to a point approximately 0.250 inches from the proximal end 232 of the sound board 222, where the tapering upper face 238 intersects the bottom of the groove 240. A pair of small protrusions or pegs 239 project vertically upward from the horizontal portion 238A of the upper face 238 proximate the distal end 234 of the sound board 222. The pegs 239 extend approximately 0.040 inches above the horizontal portion 238A of the sound board 222, which is 0.010 inches greater than the combined thicknesses of the first reed 224, the second reed 126 and the third reed 227, combined The first reed 224 has a flat top surface 242 and flat bottom surface 243 opposite and parallel to the top surface 242, with a uniform thickness of approximately 0.010 inches. The first reed 224 further has a U-shaped tip or free end 244 defined by a proximal edge 245, and a straight fixed end 246 that runs perpendicular to the longitudinal centerline of the reed opposite the free end 244. The first reed 224 has a length of approximately 3.125 inches, and a uniform width along its full length of approximately 0.422 inches. The free end 244 terminates at a flat 248 positioned in the middle of the proximal edge 245. The flat 248 is perpendicular to the longitudinal centerline of the first reed 224 and parallel to the fixed end 245, with a length of approximately 0.156 inches. A pair of mirrored straight portions 250 and 252 of the proximal edge 245 extend outward from the flat 248 at an angle of approximately 45 degrees for a distance of approximately 0.133 inches to intersect sides of the first reed 224. The first reed 224 has a fixed portion or segment 256 that extends longitudinally from the edge of the fixed end 246 to the distal end of the brace 228 in the reed assembly 220, and a free portion or segment 258 that extends from the tip or flat 248 of the free end 244 to the fixed segment 256 (see FIG. 10), A pair of matching small, rectangular notches 254 are cut into the opposing sides of the first reed 224 approximately 0.400 inches from the fixed end 246 of the first reed 224 and approximately 0.010 inches from the nearest side of the reed. Each of the notches 254 opens through a small neck to the nearest side of the first reed 224.

The second reed 226 has a flat top surface 260 and flat bottom surface 261 opposite and parallel to the top surface 260, with a uniform thickness of approximately 0.010 inches. The second reed 226 further a tip or free end 262 and a fixed end 263 opposite the free end 262, with a length of approximately 2.750 inches, and a uniform width along its full length of approximately 0.422 inches. The free end 262 terminates at a generally U-shaped proximal edge 264. A flat 266 with a length of approximately 0.156 inches is centered in the middle of the proximal edge 264. A pair of mirrored straight portions 268 and 270 of the proximal edge 264 extend outward from the flat 266 at an angle of approximately 45 degrees for a distance of approximately 0.133 inches to intersect sides of the second reed 226. The second reed 226 has a fixed portion or segment 265 that extends longitudinally from the edge of the fixed end 263 to the distal end of the brace 228 in the reed assembly 220, and a free portion or segment 267 that extends from the tip or flat 266 of the free end 262 to the fixed segment 265 (see FIG. 10), A pair of matching small, rectangular notches 272 are cut into the opposing sides of the second reed 226 approximately 0.400 inches from the fixed end 263 of the second reed 226, and approximately 0.010 inches from the nearest side of the reed. Each of the notches 272 opens through a small neck to the nearest side of the second reed 226.

The third reed 227 has a flat top surface 274 and flat bottom surface 276 opposite and parallel to the top surface 274, with a uniform thickness of approximately 0.010 inches. The third reed 227 further a tip or free end 278 and a fixed end 280 opposite the free end 278, with a length of approximately 2.000 inches, and a uniform width along its full length of approximately 0.422 inches. The free end 278 terminates at a generally U-shaped proximal edge 282. A flat 284 with a length of approximately 0.156 inches is centered in the middle of the proximal edge 282. A pair of mirrored straight portions 286 and 288 of the proximal edge 282 extend outward from the flat 284 at an angle of approximately 45 degrees for a distance of approximately 0.133 inches to intersect sides of the third reed 227. The third reed 227 has a fixed portion or segment 275 that extends longitudinally from the edge of the fixed end 280 to the distal end of the brace 228 in the reed assembly 220, and a free portion or segment 277 that extends from the tip or flat 284 of the free end 278 to the fixed segment 275 (see FIG. 10), A pair of matching small, rectangular notches 290 are cut into the opposing sides of the third reed 227 approximately 0.400 inches from the fixed end 280 of the third reed 227, and approximately 0.010 inches from the nearest side of the reed. Each of the notches 290 opens through a small neck to the nearest side of the third reed 227.

The upper brace 228 has a flat, rectangular lower face 292, with a length of approximately 0.625 inches, a width of approximately 0.422 inches, and a uniform semi-circular cross-section with a radius of approximately 0.200 inches along the full length of the brace. Each end of the upper brace 228 is flat and perpendicular to the lower face 292. A pair of small detents 294 are formed in the lower face 292 proximate one of the ends of the upper brace 228.

When the triple reed assembly 220 is properly assembled, the first reed 224 and the second reed 226 and the third reed 227 are all sandwiched between the sound board 222 and the upper brace 238 in the assembly holder 57, such that: (i) the horizontal portion 238A of the upper face 238 of the sound board 222 engages the bottom surface 243 of the first reed 224 with the distal end 234 of the sound board 222 adjacent the fixed end 246 of the first reed 224, resulting in a wedge-shaped separation or gap G2 between the bottom surface 243 and the angled portion 238B of the upper face 238 of the sound board 222; (ii) the top surface 242 of the first reed 224 engages the bottom surface 261 of the second reed 226 with the fixed end 246 of the first reed 224 adjacent the fixed end 263 of the second reed 226; (iii) the top surface 260 of the second reed 226 engages the bottom surface 276 of the third reed 227; (iv) the top surface 274 of the third reed engages the lower face 274 of the upper brace 228; and (v) the first reed 224, the second reed 226, the third reed 227, the sound board 222 and the upper brace 228 are positioned snugly into the assembly holder 57 so that the free ends 244 and 262 and 278 of the first reed 224 and the second reed 226 and third reed 227, respectively, are secured between the sound board 222 and the upper brace 228 in the assembly holder 57.

Further, when the reed assembly 220 is properly assembled, the pegs 239 align with and are sized and shaped to fit snugly within the notches 254 of the first reed 224, the notches 272 of the second reed 226, the notches 290 of the third reed 227, and into the detents 294 in the upper brace 228. It will be appreciated that the pegs 239 act as alignment pins to hold the reeds 224 and 226 and 227 in proper orientation laterally, longitudinally and radially relative to one another, the sound board 222 and the upper brace 228.

As can be appreciated, when a user blows through the blowhole 49, air will be forced against the front of the reed assembly 220. The second reed 226 and third reed 227 act as a brake or stabilizer for the portion of the first reed 224 extending over the gap G2. Due to the stabilizing presence of the second reed 226 and third reed 227 pressed against the top of the first reed 224, the first reed 224 will activate, that is initiate resonant vibration, much quicker than will a traditional multi-reed animal call lacking the disclosed configuration of the reeds. However, because of the positioning of the second reed 226 and the third reed 227 relative to the first reed 224, the resonant vibration of the first reed 224 produces a tone that is short and abrupt as compared to the tone produced by the resonant vibration of the first reed 124 of the double reed assembly 120.

Moreover, it has been determined that for best results, the reeds must be constrained to specific dimensional ranges and ratios. In particular, the first reed 224 preferably has the following dimensions: overall length=3.125+0.250/−0.200 inches; width=0.422+0.188/−0.125 inches; width of the flat 248=0.156+0.188/−0.125 inches; longitudinal length of each straight portion 250 and 252=0.133+0.250/−0.200 inches; and thickness of 0.010+0.010/−0.003 inches. The second reed 226 preferably has the following dimensions: overall length=2.750+0.250/−0.200 inches; width=0.422+ 0.188/−0.125 inches; width of the flat 266=0.156+0.188/− 0.125 inches; longitudinal length of each straight portion 268 and 270=0.133+0.250/−0.200 inches; and thickness of 0.010+0.010/−0.003 inches. The third reed 227 preferably has the following dimensions: overall length=2.000+0.250/− 0.200 inches; width=0.422+0.188/−0.125 inches; width of the flat 284=0.156+0.188/−0.125 inches; longitudinal length of each straight portion 286 and 288=0.133+0.250/−0.200 inches; and thickness of 0.010+0.010/−0.003 inches. One of ordinary skill in the art will recognize that these dimensions, when taken in relation to one another, provide the range of ratios between the various dimensions of each of components of the triple reed assembly 220.

Further, the first reed 224 even more preferably has the following dimensions: overall length=3.125+0.100/−0.100 inches; width=0.422+0.100/−0.100 inches; width of the flat 248=0.156+0.100/−0.100 inches; longitudinal length of each straight portion 250 and 252=0.133+0.100/−0.100 inches; and thickness of 0.010+0.010/−0.003 inches. The second reed 226 more preferably has the following dimensions: overall length=2.750+0.100/−0.100 inches; width=0.422+0.100/−0.100 inches; width of the flat 266=0.156+0.100/−0.100 inches; longitudinal length of each straight portion 268 and 270=0.133+0.100/−0.100 inches; and thickness of 0.010+0.010/−0.003 inches. The third reed 227 more preferably has the following dimensions: overall length=2.000+0.100/−0.100 inches; width=0.422+0.100/−0.100 inches; width of the flat 284=0.156+0.100/−0.100 inches; longitudinal length of each straight portion 286 and 288=0.133+0.100/−0.100 inches; and thickness of 0.010+0.010/−0.003 inches. Again, one of ordinary skill in the art will recognize that these dimensions, when taken in relation to one another, provide the range of ratios between the various dimensions of each of components of the triple reed assembly 220.

While I have described in the detailed description several configurations that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel mechanisms of the present invention, shown by way of example at 10 can be arranged in a number of other and related varieties of configurations without departing from or expanding beyond the scope of my invention as set forth in the claims.

For example, the nipples 56, 58 and 60 can alternatively have tapered outer surfaces to provide a press fit between the mouthpiece 12 and the connecting collar 50 when assembled together. Further, one of ordinary skill in the art will recognize that the heights of the sound boards 122 and 222 and upper braces 128 and 228 can vary depending upon the thickness of each of the reeds that they secure in the region between the sound board and upper brace, so long as the fixed ends of the reed assemblies are sized and shaped to fit snugly and securely into the appropriate nipple, such as 56 and 58.

In addition, the sound boards 122 and 222 need not taper downward, or at a particular angle or taper for a particular length. Rather, the sound boards 122 and 222 can be configured to have no separation from the first reed 124 and 224, respectively, or a variety of gap configurations, so long as the reeds 124 and 224 can operate to produce the desired calls without interference from the sound boards.

Also, the grooves 140 and 240 can be different configurations, including for example various cross-sectional sizes and shapes, and need not be uniform in length and/or shape, long as the sound boards 122 and 222 provide the proper stability to the reed assemblies 120 and 220 respectively, and in particular to the first reeds 124 and 224, and provide an air path adequate to perform the functions demanded by the reed assemblies 120 and 220.

By way of further example, one or both of the reed assemblies 120 and 220 may be configured without an upper brace, such as at 128 or 228. Rather, the nipple 56 or 58 may be configured to block or partially block the airflow over the top of the reeds. In addition, one or both of the reed assemblies 120 and 220 may be configured without a soundboard, such as at 122 or 222. Rather, a brace, a set of braces or other such device may be positioned under the first reed 124 or 224, to provide support without providing the particular air path as that of the soundboard 122 or 222.

Additional variations or modifications to the configuration of the novel animal call of the present invention, shown by way of example at 10, may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention. Accordingly, all matter contained in the above description or shown in the accompanying drawings should be interpreted as illustrative and not in a limiting sense.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

What is claimed is:

1. A reed-actuation animal call comprising:
   a. a body having a sidewall defining a first upstream chamber, said first upstream chamber having an inlet that opens into the first upstream chamber and an outlet that exits from the first upstream chamber;
   b. a sound board positioned at least in part in said first upstream chamber, said sound board having a mounting surface, said sound board being secured to said sidewall of said first upstream chamber;
   c. a brace;
   d. a generally rectangular first reed positioned at least in part inside the first upstream chamber, said first reed having an overall length and an overall width, said first reed having a fixed segment and a free segment opposite the fixed segment, said first reed having a generally flat lower face and a generally flat upper face opposite the first face, said first reed lower face having a mounting portion secured against the mounting surface of said sound board, the free segment of said first reed extending from said mounting surface and having a length, said first reed oriented relative to the first upstream chamber inlet to allow air to flow from the inlet against the free segment of said first reed; and
   e. a generally rectangular second reed positioned at least in part inside the first upstream chamber, said second reed having an overall length and an overall width, said second reed having a fixed segment and a free segment opposite the fixed segment, said second reed having generally flat lower face and a generally flat upper face opposite the first face, said second reed fixed segment being secured to said first reed fixed segment between the sound board and the brace such that the first and second reeds align longitudinally, the length of the first reed free segment being greater than the length of the second reed free segment such that the first reed free segment extends longitudinally beyond the second reed free segment to define an actuation portion of said first reed, the length of said free segment of said first reed being at least 2.05 times the length of the free segment of said second reed, said sound board, brace, first reed and second reed collectively comprising a double reed assembly, said brace and said sound board holding the fixed segments of each of said first and second reeds there between to define a reed assembly joint.

2. The animal call of claim 1, wherein said brace comprises a generally flat lower face, said lower face pressing against the upper face of said second reed fixed segment.

3. The animal call of claim 1, wherein said sound board comprises a longitudinal groove extending substantially the length of said sound board, said groove facing said first reed lower face.

4. The animal call of claim 1, wherein said sound board further comprises an angled portion extending downward from said mounting surface, said angled portion being separated from said first reed lower face.

5. The animal call of claim 4, wherein said sound board angled portion angles away from said first reed lower face with a constant slope.

6. The animal call of claim 1, wherein said first reed free segment has a length of 1.944+0.250/−0.200 inches.

7. The animal call of claim 1, wherein one of said first reed free segment and second reed free segment has a generally uniform width of 0.422+0.188/−0.125 inches.

8. The animal call of claim 1, wherein one of said first reed free segment and second reed free segment has a generally uniform thickness of 0.010+0.010/−0.003 inches.

9. The animal call of claim 1, wherein said second reed free segment has a length of 0.600+0.250/−0.200 inches.

10. The animal call of claim 1, wherein one of said first reed and second reed comprises a distal edge along the perimeter of the free segment of one of said first and second reeds, said distal edge comprising a lateral flat positioned in the center of said distal edge, said flat having a width of 0.156+0.188/−0.125 inches.

11. The animal call of claim 1, further comprising a first reed assembly holder, said holder shaped and sized to receive and retain together said assembly joint.

12. The animal call of claim 1, wherein the width of one of said first reed and said second reed expands as said free segment extends from said assembly joint.

13. The animal call of claim 1, further comprising a second upstream chamber and a common downstream chamber, said second upstream chamber adapted to house a second reed assembly proximate the double reed assembly, said common downstream chamber communicating with said first upstream chamber and communicating with said second upstream chamber.

14. A reed-actuation animal call comprising:
a. a body having a sidewall defining a first upstream chamber, said first upstream chamber having an inlet that opens into the first upstream chamber and an outlet that exits from the first upstream chamber;
b. a sound board positioned at least in part in said first upstream chamber, said sound board having a mounting surface, said sound board being secured to said sidewall of said first upstream chamber;
c. a brace;
d. a generally rectangular first reed positioned at least in part inside the first upstream chamber, said first reed having an overall length and an overall width, said first reed having a fixed segment and a free segment opposite the fixed segment, said first reed having a generally flat lower face and a generally flat upper face opposite the first face, said first reed lower face having a mounting portion secured against the mounting surface of said sound board, the free segment of said first reed extending from said mounting surface and having a length, said first reed oriented relative to the first upstream chamber inlet to allow air to flow from the inlet against the free segment of said first reed; and
e. a generally rectangular second reed positioned at least in part inside the first upstream chamber, said second reed having an overall length and an overall width, said second reed having a fixed segment and a free segment opposite the fixed segment, said second reed having generally flat lower face and a generally flat upper face opposite the first face, said second reed fixed segment being secured to said first reed fixed segment between the sound board and the brace such that the first and second reeds align longitudinally, the length of the first reed free segment being greater than the length of the second reed free segment such that the first reed free segment extends longitudinally beyond the second reed free segment to define an actuation portion of said first reed;
f. a generally rectangular third reed positioned at least in part inside the first upstream chamber, said third reed having an overall length and an overall width, said third reed having a fixed segment and a free segment opposite the fixed segment, said third reed having generally flat lower face and a generally flat upper face opposite the first face, said third reed fixed segment being secured to said second reed fixed segment between the first reed fixed segment and the brace such that the first and second and third reeds align longitudinally, the length of the second reed free segment being greater than the length of the third reed free segment such that the second reed free segment extends longitudinally beyond the third reed free segment to define an actuation portion of said second reed;
wherein, the length of said free segment of said first reed is at least ten percent greater than the length of the free segment of said second reed; the length of said free segment of said second reed is at least fifty percent greater than the length of the free segment of said third reed; said sound board, brace, first reed, second reed and third reed collectively comprising a triple reed assembly; and said brace and said sound board holding the fixed segments of each of said first and second and third reeds there between to define a reed assembly joint.

15. The animal call of claim 14, wherein said sound board comprises a longitudinal groove extending substantially the length of said sound board, said groove facing said first reed lower face.

16. The animal call of claim 14, wherein said sound board further comprises an angled portion extending downward from said mounting surface, said angled portion being separated from said first reed lower face.

17. The animal call of claim 14, wherein said first reed free segment has a length of 2.100+0.250/−0.200 inches.

18. The animal call of claim 14, wherein said second reed free segment has a length of 1.725+0.250/−0.200 inches.

19. The animal call of claim 14, wherein said third reed free segment has a length of 0.975+0.250/−0.200 inches.

20. The animal call of claim 14, wherein one of said first reed free segment, said second reed free segment and said third reed free segment, has a generally uniform thickness of 0.010+0.010/−0.003 inches.

21. The animal call of claim 14, wherein one of said first reed free segment, said second reed free segment and said third reed free segment, has a generally uniform width of 0.422+0.188/−0.125 inches.

22. The animal call of claim 14, further comprising a second upstream chamber and a common downstream chamber, said second upstream chamber adapted to house a second reed assembly proximate the triple reed assembly, said common downstream chamber communicating with said first upstream chamber and communicating with said second upstream chamber.

\* \* \* \* \*